Figure 1:
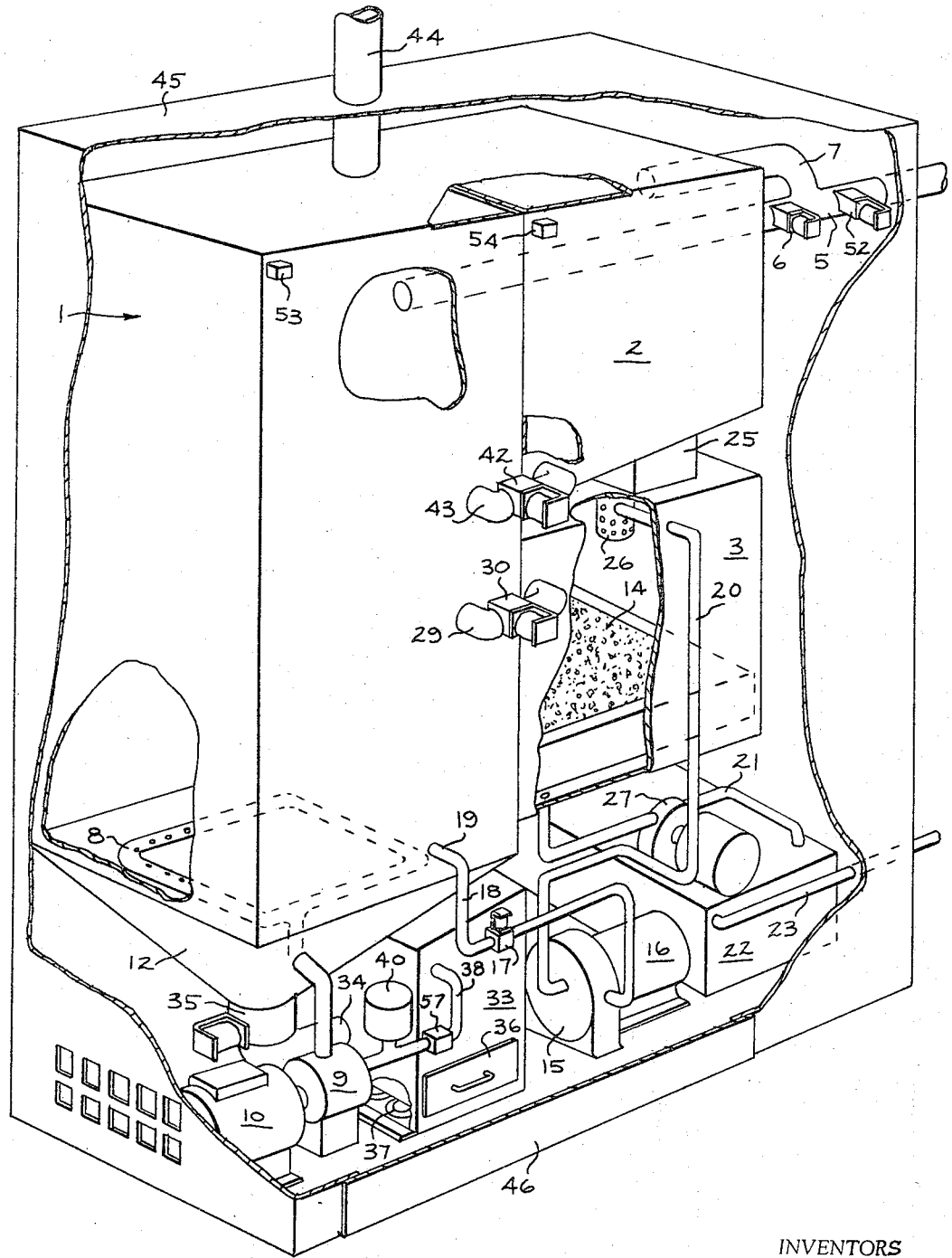

INVENTORS
KENNETH S. WATSON,
ROBERT P. FARRELL, JR
& GEORGE E. BENNETT
BY
THEIR ATTORNEY

United States Patent Office 3,327,855
Patented June 27, 1967

3,327,855
HOME WASTEWATER TREATING UNIT
Kenneth S. Watson, Robert P. Farrell, Jr., and George E. Bennett, Louisville, Ky., assignors to General Electric Company, a corporation of New York
Filed June 12, 1964, Ser. No. 374,573
9 Claims. (Cl. 210—108)

The present invention relates to an improved home unit for the treatment of home wastewater, i.e. home sewage, and is more particularly concerned with a completely self-contained automatic wastewater treating unit adapted to produce a liquid effluent suitable for disposal on or above the surface of the ground.

In many locations, the most generally used method of sewage disposal available is the septic tank or cesspool. One fault with the existing septic tank and similar concepts is the soil absorption system; involving disposal of the liquid effluent under ground. The land in many areas is unsuitable for continuous absorption of substantial amounts of liquid effluent with the result that the septic tanks in such areas fail at a very high rate. A second factor which contributes to the failure of soil absorption is the solids carried in the effluent which clog the soil pores. This clogging takes place even in those septic tank systems which are periodically serviced for the removal of accumulated solids.

A more recent method purported to solve the waste problem from an individual home is that of treatment in an aeration chamber followed by and connected to a settling chamber in which any entering volume of wastewater displaces an equivalent volume out of the system. This approach yields a better effluent than a septic tank but absorption in the subsoil is still a problem. Further, no provisions for absolutely quiescent settling of solids is provided, thus, some solids which are intended to be removed by settling actually do not settle and are discharged in the effluent.

It is a primary object of the present invention to provide a home wastewater or sewage treatment unit which eliminates the necessity for underground disposal of the liquid effluent and which includes means for handling solids in such a manner that they are controlled and discharged of solids in the effluent does not take place.

Another object of the invention is to provide a completely self-contained automatic wastewater treating unit designed to provide an effluent containing no harmful micro-organisms or objectionable odor or color and having a low biochemical oxygen demand (B.O.D.) despite wide fluctuations and variations in the amount of raw sewage introduced into the unit.

A further object of the invention is to provide an automatically operated home wastewater treating unit in which a single uncompartmented tank or chamber is employed for both aerobic treatment of the wastewater as it accumulates and the subsequent separation of solids, with periodic discharge of the effluent.

Another object of the invention is to provide an automatic home wastewater treating unit including means for periodically and automatically incinerating excess solids.

A further object of the invention is to provide a treating unit including improved means for sterilizing and a means of filtering the effluent from the treating chamber and for backwashing the filter as required.

Another object of the invention is to provide, in combination with a home wastewater treating unit, automatic controls designed to control the operation of the unit in such a manner that only periodic servicing is required.

Further objects and advantages of the invention will become apparent from the following description and the features of novelty which characterize the invention will be pointed out with particularity in the claims annexed to and forming part of this specification.

In carrying out the objects of the present invention, there is provided a home wastewater treating unit comprising a treating chamber or tank for the aerobic stabilization and clarification of wastewater, a holding tank for retaining or storing wastewater during certain portions of the treatment thereof in the treating chamber and a filter chamber for filtering the liquid effluent periodically discharged from the treating chamber. The unit is designed for cycle operation and during a major portion of any one cycle, raw wastewater is fed directly into the treating chamber which includes means for diffusing air through the contents of the chamber to promote the aerobic stabilization thereof. During a minor portion of the cycle, raw wastewater is automatically retained in the holding tank while aeration of the contents of the treating chamber is discontinued and the solids therein are permitted to settle. Means are provided for conducting the supernatant liquid from the treating chamber through the filtering chamber for discharge outside the unit and, in order to maintain the filter in operable condition, for periodically backwashing the filter using a portion of the liquid effluent. Means are also provided for periodically, although not necessarily during each cycle of operation of the unit, transferring solids from the treating chamber to an incinerator forming part of the unit in which the solids are automatically burned and the gaseous products of combustion conveyed into the lower portion of the treating chamber for additional oxidation in, or washing by, the liquid therein.

Figure 2:
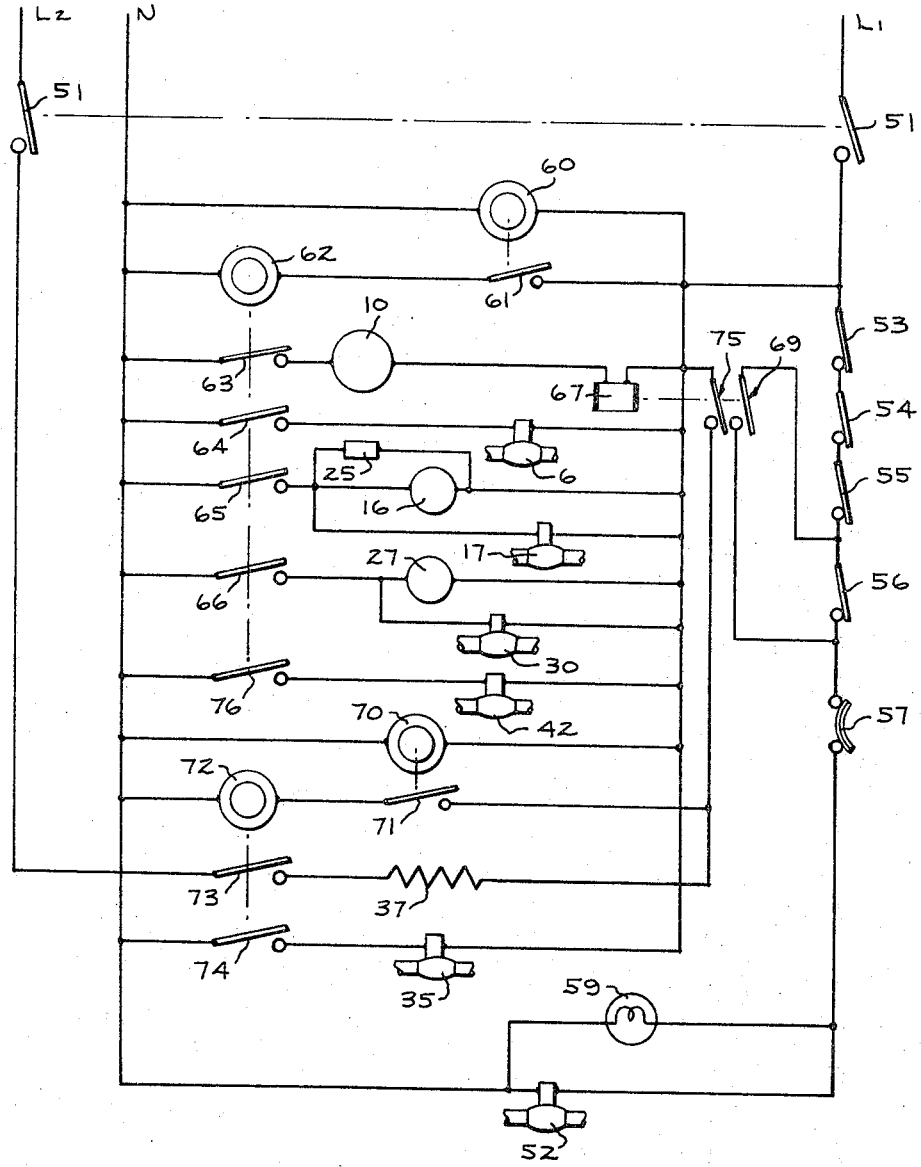
Figure 3:
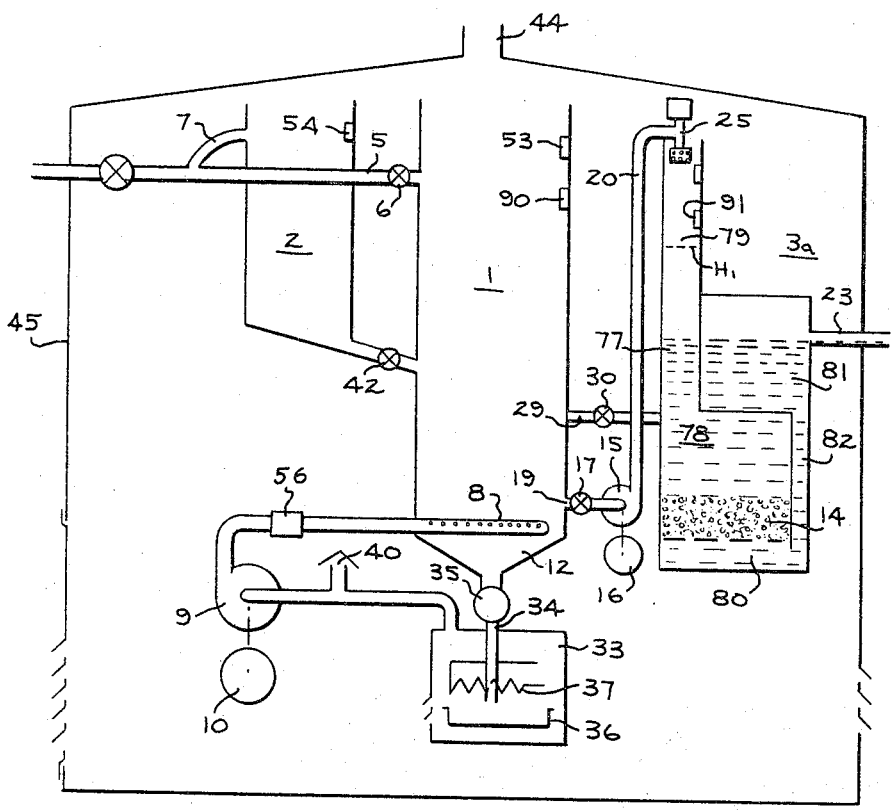
Figure 4:
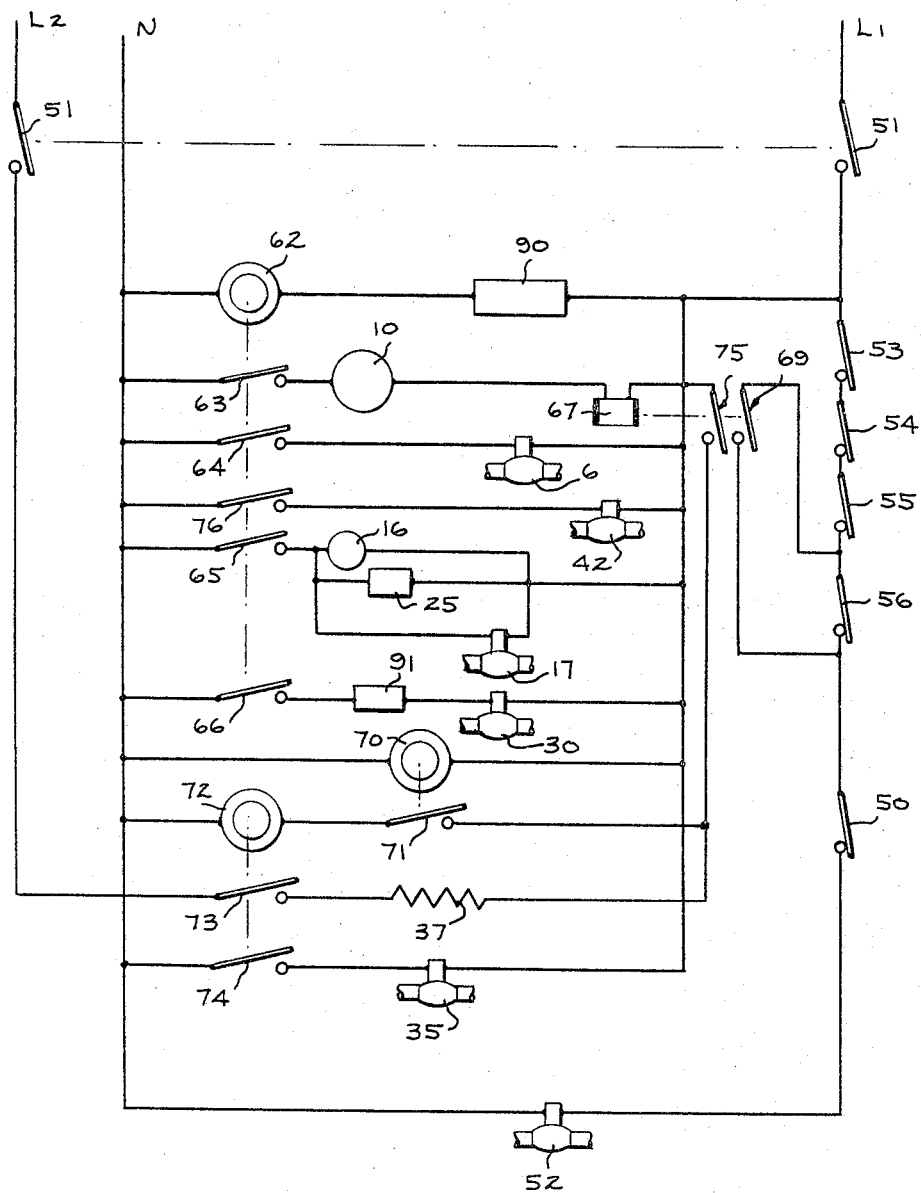

For a better understanding of the invention reference may be had to the accompanying drawing in which:

FIGURE 1 is a perspective view, partly in section, of one embodiment of a home sewage or wastewater treating unit of the present invention;

FIGURE 2 diagrammaitcally illustrates a control circuit for the automatic control of the unit of FIGURE 1;

FIGURE 3 is a schematic representation of a second embodiment of the invention; and FIGURE 4 diagrammatically illustrates a control circuit for the embodiment of FIGURE 3.

With reference to FIGURE 1 of the drawing, there is illustrated one embodiment of a home wastewater treating unit comprising a primary treating tank or chamber 1, a holding tank 2 and a filter chamber 3. In order to provide a compact unit, the holding tank is disposed adjacent the upper portion or the treating chamber 1 while the filter chamber 3 is disposed below the holding tank and adjacent the lower portion of the treating chamber 1. Raw household wastewater or sewage which has been previously passed through a suitable device (not shown) for cutting up the solids content of the wastewater into the form of relatively small particles, is normally fed directly into the treating chamber 1 through a conduit 5 provided with a normally open valve 6. During certain periods of operation of the unit valve 6 is closed and wastewater fed to the unit flows through a side line 7 into the holding tank 2.

The treating chamber 1 is preferably designed to have a capacity somewhat larger than the average daily wastewater output of the home so that it can be operated on a daily cycle. During each cycle it functions alternatively as an aeration chamber and as a settling chamber. For the purpose of aerating the contents of the chamber 1, there is provided an aeration ring 8 in the lower portion of the chamber 1 to which air is fed by an air compressor 9 driven by a motor 10 positioned below the chamber 1.

The bottom of the chamber 1 preferably comprises sloping walls forming a hopper 12 in which the solids collect during operation of the chamber 1 as a settling chamber. The aeration ring 8 is preferably positioned near the top of the hopper 12.

The filter chamber 3 includes a filter bed 14 of sand, granulated coal or other suitable filtering media adjacent to but spaced from the bottom wall of the filter chamber. A pump 15 driven by a motor 16 is connected to chamber 1 by a conduit 18 having its inlet 19 communicating with the treating chamber a few inches above the aeration ring 8 and to the upper portion of the filter chamber 3 by a conduit 20. Conduit 18 also includes a normally closed valve 17. At the end of the settling period of the treatment cycle, the relatively clear supernatant liquid remaining after settling of solids into the hopper 12 is pumped to the filter chamber. After passing through the gravity filter bed 14, liquid introduced into filter chamber flows from the bottom portion thereof through a conduit 21 into a storage chamber 22 from which it overflows through a discharge line 23 into a storm sewer, stream or into a surface drainage network for irrigation uses or the like. If desired, the filtered effluent may be stored in chamber 22 until required for irrigation purposes or the like. It should also be understood that the filter may be of the well known pressure type instead of gravity flow.

For the purpose of killing harmful residual bacteria in the effluent passing through the filter chamber 3 and to promote the removal of color from this effluent, there is provided a chlorine tablet feeder or chlorinator 25 at the outlet end of the conduit 20. The chlorinator 25 is designed to supply chlorine in the form of one or more slow-dissolving pellets of calcium hypochlorite to the perforated chamber 26 connected to the outlet end of the conduit 20 for solution in the effluent passing into the filter chamber 3 during transfer thereof from the treating chamber 1 to the filter chamber. If desired, the chlorine may be added to the effluent after it has left the filter chamber or in the tank 22. In the latter case, the tank 22 is of a size sufficient to impound the effluent for a period sufficient to assure adequate contact time for sterilization.

In order to backwash the filter bed 14 so as to maintain adequate flow rates, some of the filtered effluent stored in the storage tank 22 is pumped in reverse direction through the filter bed 14 by means of the motor driven centrifugal pump 27 in conduit 21. This washwater after passing upwardly through the filter bed 14, is discharged along with solids removed from the bed back into the treating chamber 1 through a conduit 29 provided with a normally closed valve means 30 and positioned above the top surface of the filter bed when filter is in the expanded condition during washing.

For periodically disposing of a portion of the solids or sludge collecting in the bottom of the treating chamber 1, there is provided an incinerator 33 connected to the bottom of the treating chamber 1 by means of a conduit 34 provided with a normally closed valve 35. When valve 35 is opened the solids which are in a fluid or sludge-like state flow through the conduit 34 into a bin or drawer 36 in the incinerator. Energization of an electrical heating element 37 in the incinerator 33 first removes the liquid from the sludge in the receptacle 36 and thereafter heats the solid residue to combustion temperatures. During this operation, the vaporized products, including the gaseous products of combustion, are withdrawn from the incinerator through a conduit 38 by the air compressor 9 and become mixed with the air taken in by the compressor through the normal air intake 40. The gaseous products of combustion are thereby additionally oxidized or absorbed into the contents of the treating chamber 1. In addition, any minute fly ash particles are trapped in the contents of the treating tank 1 and are eventually returned with subsequent sludge transfer to the incinerator.

The holding tank 2 is designed to store raw wastewater during the period in which the treating tank 1 is functioning as a settling chamber. When the valve 6 is closed, raw wastewater enters the holding tank 2 through the side line 7. After the supernatant liquid has been drawn off from the chamber 1 following a settling period and the filter bed 14 has been backwashed if called for, any sewage which has accumulated in the holding tank 2 is discharged into the chamber 1 by opening a normally closed valve 42 in a conduit 43 connecting the holding tank 2 to the treating chamber 1.

Additional components of the unit include a vent 44 for venting the gases from the top of the treating chamber 1 and holding tank 2 and a louvered housing 45 surrounding and enclosing at least the lower portion of the unit including the air compressor 9, the storage tank 22 and associated components. Fumes from these components are confined within the housing 45 and are exhausted from the housing through chamber 1 by means of the compressor 9. A servicing door 46 provides means for obtaining access to the pumps, motors and the ash drawer 36.

As previously described, the unit is designed for cycle operation in which a major portion of the cycle is devoted to the aeration and digestion of the wastewater in the treating tank chamber 1 and a short portion of the cycle is devoted to the operation of the chamber 1 as a settling tank so that relatively clear liquid can be drawn off through the filter and discharged from unit. The length of the cycle will depend to some extent upon the capacity of the unit and the service required of the unit. In general, if the operation of the unit is on the time basis, it is contemplated that the unit will operate on a 24 hour cycle during which wastewater is introduced directly into the treating chamber 1 and aerated during most of the 24 hour period, as for example from 6 a.m. to 4 a.m. while during the remaining portion of the period, comprising about 2 hours, any wastewater fed to the unit is held in the holding tank 2 while the wastewater in the main treating tank 1 is subjected to the settling operation.

Electrical control circuitry for automatically controlling the operation of the unit through such a cycle is illustrated in FIGURE 2 of the drawing.

Line power is supplied to the unit by lines L1, N and L2, energization of the unit and the control means being controlled by a main switch 51 in lines L1 and L2. An electrically operated main valve 52, in the conduit 5 upstream from the connection thereof to the side line 7 is provided as a safety feature to stop the flow of wastewater into the unit under certain malfunction or other conditions in the unit. This main valve connected across the line L1 and N is under the control of a plurality of series-connected switches including a normally closed flood float switch 53 provided in the upper portion of the treating chamber 1 for stopping the operation of the system in the event that the treating chamber becomes filled beyond its normal operating level, a second similar normally closed high level or flood switch 54 provided in the holding tank 2, a normally closed chlorinator switch 55 designed to open if the supply of chlorinating material in chlorinator 25 is allowed to become exhausted, a normally closed air pressure switch 56 designed to open upon failure of the air flow system including the compressor 9 and the motor 10, and a high temperature incinerator thermostat switch 57 designed to open upon the occurrence of abnormally high temperatures in the incinerator 33. It will be noted that each of these switches are safety switches designed to stop the flow of wastewater to the unit in the case of certain malfunctioning or abnormal conditions. A warning light or buzzer 59 which is actuated by the absence of a voltage across it, and is energized by a separate source of power such as a battery (not shown) may be used as means for immediately notifying the home owner of the interrupting of the operation of the unit.

A treatment cycle timer 60 connected across the lines L1 and N and operable for example on a 24 hour cycle, or as an alternative a suitable float switch in the treating tank 1, is provided for periodically closing a switch 61 to energize a program timer 62. The program timer 62 operates a plurality of timer switches for stopping aeration of and the flow of raw wastewater to chamber 1 and for controlling the operation of the unit during the minor portion of the operating cycle, that is during the time that the chamber 1 operates as a setting or separating chamber.

More specifically, the program timer 62 operates a switch 63 for controlling the energization of the air compressor motor 10, a switch 64 for controlling the operation of the valve 6, a switch 65 for controlling the operation of the effluent pump motor 16 and the valve 17 and a switch 66 controlling the operation of the backwash pump 27 and the valve 30 in the return line from the chamber 3 to the treating chamber 1. In series connection with the switch 63 and the air compressor motor 10 is a relay coil 67 for operating a switch 69 bypassing the air pressure switch 56 so that during that portion of the cycle when compressor is supposed to be off, opening of the air pressure switch 56 will not cause main valve 52 to close.

Once the program timer 62 is energized by closing of the switch 61, the swtiches 63, 64, 65, 66 and 76 are designed to control a sequence of operations involving first the de-energization of the compressor motor 10 to interrupt the flow of air into the treating tank 1 and the closing of the valve 6 in the line 5 thereby stopping the flow of raw wastewater directly into the treating tank 1.

With the compressor motor 10 stopped to interrupt the flow of air through the treating chamber 1, the suspended solids in the wastewater contained in the treating chamber 1 settle into the hopper portion 12. After sufficient time has been allowed for settling of substantially all of the suspended solid material, switch 65 is closed to energize the filter pump motor 16, open valve 17 and operate the chlorinator 25 to supply chlorinating material to chamber 26. The supernatant liquid is withdrawn from the treating chamber 1 by the pump 15 and discharged through chlorinator basket 26, into the filter chamber 3. This liquid, after passing through the filter bed 14, flows through the conduit 21 into the storage chamber 22 and overflows from that chamber through the discharge line 23. Switch 65 is opened to de-energize the filter pump motor 16 and to close the valve 17 after a period of time sufficient to assure transfer of the supernatant liquid into the filter chamber 3. As soon as enough time has elapsed for this liquid to pass through the filter 14, switch 66 operates to energize the pump 27 and to open the valve 30 for a time sufficient to pump sufficient liquid from the storage tank 22 back through the filter bed 14 to backwash the filter. The backwash liquid is discharged through the conduit 29 into the treating chamber 1. If desired, switch 66 may be designed to initiate a backwash every third or fourth cycle rather than during each cycle. Switch 76 is then operated to open the normally closed valve 42 for a short time so tht any raw wastewater stored in the holding tank 2 during the time valve 6 has been closed will be discharged from the holding tank 2 into the treating chamber 1. Subsequent closing of the switch 63 to energize the compressor motor 10 and operation of the switch 64 to again open the wastewater valve 6 conditions the unit for operation on a subsequent cycle.

Generally it is necessary to remove and incinerate sludge settling to the bottom of the treating chamber 1 only periodically, as for example once a week. The operation of this component of the unit is controlled by a main incinerator timer 70 which periodically closes a switch 71 to energize an incinerator program timer 72, driving timer switches 73 and 74. Also included in the circuit with the program timer switch 71 is a normally open switch 75 operated by the relay 67 and designed to prevent the operation of the incinerator program timer 72 and heating element 37 unless the compressor motor 10 is also energized.

Energization of the incinerator program timer 72 operates switch 74 to open the valve 35 for a brief period of time to permit a measured amount of sludge to be transferred from the lower portion of the treating chamber 1 into the incinerator bin 36. Only part of the solids are transferred at any one time so as not to destroy the continuous bacterial action in the chamber 1. Electric heating unit 37 is then energized by switch 73 and the contents of the bin 36 are heated for a time sufficient to complete the burning of all of the combustible material contained therein. The only servicing required of the home owner is occasional emptying of the residual ash collecting in the bin 36.

It will be obvious, of course, that the functions of the timer 60 may be combined with those of the incinerator main timer 70 so that the program timers 62 and 72 are respectively energized once a day and once a week, for example, to control the operations hereinbefore described.

The embodiment of the invention illustrated in FIGURE 3 differs primarily from the embodiment of FIGURE 1 in that it is designed to provide maximum exposure of the effluent to the chlorine material and to initiate backwashing of the filter only when required.

In FIGURE 3 and also in FIGURE 4 illustrating the control circuit for the unit of FIGURE 3, the same reference numerals have been used to indicate the same or similar parts or components.

In order to provide a prolonged chlorination of the effluent from the treating chamber 1 and at the same time provide means whereby the filter bed 14 will be backwashed only when necessary to maintain it in satisfactory operation, the filter chamber component of the embodiment shown in FIGURE 3 which is generally indicated by the numeral 3a includes a first chamber 77 including a first portion 78 of a capacity sufficient to contain the filter bed 14 in its expanded condition during backwash of the filter bed and a standpipe section 79 above the lower portion 78. An under drain chamber 80 below the filter bed receives the effluent passing through the filter and is in turn connected to a storage chamber 81 by means of a passage 82. The storage chamber 81 is disposed above the portion 78 of the filter chamber and is more specifically disposed above the conduit 29 which transfers backwash liquid back to the treating chamber 1 during backwash of the filter 14.

The entire component 3a including the portion 78 of the filter chamber and the storage chamber 81 is designed to store the liquid periodically pumped by the pump 15 from the treating chamber 1 for sufficient time to assure sterilization thereof by the chlorinating material introduced by means of the chlorinator 25 before discharge thereof through line 23. Normally, component 3a has a storage capacity including the volume ahead of filter 14 and the volume of storage chamber 81 downstream from the filter 14 which is sufficient to provide adequate chlorine contact time to assure complete disinfection of the effluent before discharge through conduit 23.

The detailed operation of component 3a and certain other features of the unit of FIGURE 3 will be described in connection with the description of the control circuitry of FIGURE 4 provided for controlling the operation of the unit of FIGURE 3.

The control circuit of FIGURE 4 is designed to initiate a settling operation within the treating chamber 1 only when the contents thereof reach a predetermined depth as measured by means of a liquid level switch 90 positioned in the upper portion of the treating chamber 1 below the flood level switch 53. Operation of the liquid level switch 90 energizes timer motor 62 and is designed to continue energization thereof for a period sufficient to permit the timer 62 to operate switches 63, 64, 65, 66 and 76 through the portion of the cycle hereinbefore described in connection with the embodiment of FIGURE 1. In the sequence of operations controlled by the timer 62, the switch 66 in the circuit including the valve 30 is closed in proper sequence each time the timer 62 is operating. However, a backwash control switch 91 in the same circuit prevents opening of the valve 30 and backwash of the filter unless the pores of the filter 14 have become clogged sufficient to require such backwash.

To this end, the component 3a in the unit of FIGURE 3 is designed so that during each normal cycle of discharge of supernatant liquid from the treatment chamber 1, the liquid will flow through the component 3a at such a rate that the normal level, or height, thereof, will be below the liquid level switch 91 positioned in standpipe 79. As the filter becomes clogged by particles carried in the liquid passing through the filter, the increased flow resistance of the filter bed 14 will cause the head of liquid in the standpipe 79 to rise. When this head reaches the height of the liquid level switch 91, this switch closes. Switch 91 includes time delay means so that it will remain closed until backwashing is completed. With switch 91 closed, subsequent closing of switch 66, by the timer 62, opens valve 30. The head of liquid contained within the storage chamber 81 then causes a back flow of filtered liquid through the filter bed 14. Substantially all of this backwash liquid will be transferred through the conduit 29 including the valve 30 back into the treating chamber 1.

The wastewater treating units of the present invention are designed to provide certain objectives and performance characteristics not attainable with the usual home treating wastewater unit. The usual septic tank is designed primarily to reduce the amount of particulate matter in wastewater. In general this is done so that the wastewater can be disposed of by percolation into the ground, utilizing a subsurface network of pipes or conduits to convey the septic tank effluent to the receiving soil. Effluent wastewater from a septic tank receiving wastewater of normal strength, i.e., 200 p.p.m. B.O.D. (biochemical oxygen demand), will have a B.O.D. of greater than 100 p.p.m. and a suspended solids concentration of 75 p.p.m. or higher.

Aerobic stabilization processes are known to produce an effluent of higher quality than can be produced by septic tanks. However, even in the case of sewage treatment plants serving a number of individual homes, it is recognized in the art that an effluent with a B.O.D. concentration of 20 p.p.m. and a suspended solids concentration of 25 p.p.m. is about the highest quality effluent which can be produced consistently over any appreciable period of time. Devices and techniques conceived for the treatment of wastewater for single family dwellings attempt only to provide a similar quality effluent and most of the time are not successful. For example, criteria set forth in publication 586 of the National Academy of Sciences—National Research Council requires that the discharged effluent be disposed of in such a way as to prevent direct human contact with it in an undiluted form and that it have an average B.O.D. concentration of less than 50 p.p.m. and a suspended solids concentration of less than 150 p.p.m.

The present invention is designed to produce an effluent water whose quality is clearly and continually superior to the type of effluent which can be produced by presently known techniques or devices. Specifically, the effluent normally has B.O.D. and suspended solid concentrations of less than 15 p.p.m. and is completely free of active pathogenic organisms. In fact, it has been demonstrated that average B.O.D. and suspended solids concentrations of less than 10 p.p.m. can be obtained over an extended period of time by means of the treating units of the present invention.

While there has been shown and described specific embodiments of the present invention, it will be understood that it is not limited thereto and it is intended by the appended claims to cover all modifications falling within the true spirit and scope of the invention.

What we claim as new and desire to secure by Letters Patent of the United States is:

1. A wastewater treating unit comprising:
a treating chamber,
means for aerating the contents of said treating chamber,
a holding chamber,
filter means,
means for operating said unit through repetitive cycles each including, in sequence, the steps of (a) introducing raw wastewater fed to said unit directly into said treating chamber and aerating the wastewater so introduced, (b) interrupting the aeration and the flow of raw wastewater into said treating chamber and storing the raw wastewater fed to said unit in said holding chamber, (c) after solids contained in said treating chamber have settled, discharging the supernatant liquid through said filter means, and (d) discharging raw wastewater stored in said holding chamber into said treating chamber.

2. A wastewater treating unit comprising:
a treating chamber,
a holding tank adjacent the upper portion of said treating chamber,
a filter chamber adjacent the lower portion of said treating chamber and beneath said holding tank,
a filter in said filter chamber,
means for introducing liquid raw wastewater into said unit including a first conduit including normally open valve means for introducing raw wastewater into said treating chamber and a second conduit for introducing said raw wastewater into said holding tank,
means for discharging wastewater from said holding tank to said treating chamber,
means for aerating the wastewater contained in said treating chamber,
an incinerator below said treating chamber,
means connected to said aerating means for conveying gaseous products of combustion from said incinerator into the bottom portion of said treating chamber,
means for periodically conveying sludge settling to the bottom of said treating chamber to said incinerator,
means for periodically conducting the liquid in said treating chamber after settling of said sludge to said filter chamber,
means for chlorinating the liquid introduced into said filter chamber,
means for automatically controlling the operation of said unit through an operating cycle including a sequence of operations comprising:
closing of said valve means to prevent flow of raw wastewater into said treating chamber whereby raw wastewater introduced into said unit collects in said holding tank,
stopping aeration and permitting solids in said tank to settle as a sludge in the bottom thereof,
conducting the supernatant liquid from said treating chamber through said filter chamber,
thereafter opening said valve means, starting aeration and transferring the raw wastewater in said holding tank to said treating chamber,
and means for periodically including in one of said operating cycles the steps of transferring collected sludge to said incinerator and operating said incinerator during a period when said treating chamber is at least partly filled.

3. A home wastewater treating unit comprising:
a treating chamber,
a holding tank adjacent the upper portion of said treating chamber,
a filter chamber adjacent the lower portion of said treating chamber and beneath said holding tank,
a filter in said filter chamber,
means for introducing liquid raw wastewater into said unit including a conduit including normally open valve means for introducing said raw wastewater into said treating chamber and a second conduit for introducing said raw wastewater into said holding tank, valve controlled means for discharging wastewater from said holding tank to said treating chamber, means for aerating the wastewater contained in said treating chamber, an incinerator below said treating chamber, means for periodically conveying sludge settling to the bottom of said treating chamber to said incinerator, means for conveying gaseous products of combustion from said incinerator into the bottom portion of said treating chamber, means for periodically conducting the supernatant liquid in said treating chamber after settling of said sludge to said filter chamber, means for chlorinating the liquid introduced into said filter chamber, means for withdrawing filtered liquid from said filter chamber, a storage chamber for storing a portion of said filtered liquid, means for conducting the filtered liquid in said storage chamber in a reverse direction through said filter for backwashing said filter, means for conducting the backwash liquid into said treating chamber, and means for periodically transferring collected sludge from said treating chamber to said incinerator and operating said incinerator during a period when said teating chamber is at least partly filled and being aerated.

4. A home wastewater treating unit comprising:
a treating chamber,
a holding tank adjacent the upper portion of said treating chamber,
a filter chamber adjacent the lower portion of said treating chamber and beneath said holding tank,
a filter in said filter chamber,
means for introducing liquid raw wastewater into said unit including a first conduit including normally open valve means for introducing said raw wastewater into said treating chamber and a second conduit for introducing said raw wastewater into said holding tank when said valve means is closed,
valve controlled means for discharging wastewater from said holding tank to said treating chamber,
means for aerating the wastewater contained in said treating chamber,
an incinerator below said treating chamber,
means for periodically conveying sludge settling to the bottom of said treating chamber to said incinerator,
means connected to said aerating means for conveying gaseous products of combustion from said incinerator into the bottom portion of said treating chamber,
means for periodically conducting the liquid in said treating chamber after settling of said sludge to said filter chamber,
means for chlorinating the liquid introduced into said filter chamber,
means for withdrawing filtered liquid from said filter chamber,
a storage chamber for storing a portion of said filtered liquid,
means for conducting the filtered liquid in said storage chamber in a reverse direction through said filter for backwashing said filter,
means for conducting the backwash liquid into said treating chamber, and
means for automatically controlling the operation of said unit through repetitive operating cycles including a sequence of operation comprising:
closing of said valve means to prevent flow of raw wastewater into said treating chamber whereby any raw wastewater introduced into said unit collects in said holding chamber,
stopping aeration and permitting solids in said tank to settle as a sludge in the bottom thereof,
conducting the supernatant liquid from said treating chamber through said filter chamber,
backwashing said filter and introducing the backwash liquid into said treating chamber,
thereafter opening said valve means, starting aeration and transferring the raw wastewater in said holding tank to said treating chamber,
and means for periodically transferring collected sludge from said treating chamber to said incinerator and operating said incinerator during a period when said treating chamber is at least partly filled and being aerated.

5. A home wastewater treating unit comprising:
a treating chamber,
a holding tank,
a filter chamber,
a filter in said filter chamber,
an incinerator,
means including a normally open valve means for introducing liquid raw wastewater into said treating chamber when said valve means is open and for storing raw wastewater in said holding tank when said valve means is closed,
means for periodically discharging said stored wastewater from said holding tank to said treating chamber,
means for aerating the wastewater contained in said treating chamber,
means for stopping aeration of said wastewater in said treating chamber to permit solids therein to settle as a sludge in the bottom of said treating chamber,
means for conducting supernatant liquid from said treating chamber to said filter chamber,
means for discharging filtered liquid from said filter chamber,
a storage chamber for storing a portion of said filtered liquid,
means operable for conducting the filtered liquid in said storage chamber in a reverse direction through said filter and into said treating chamber,
means for conveying sludge from said treating chamber to said incinerator,
means operable when said treating chamber is at least partially filled for operating said incinerator to burn said sludge,
and means for conveying the gaseous combustion products from said incinerator into the lower portion of said treating chamber.

6. A home wastewater treating unit comprising:
a treating chamber,
a holding tank,
a filter chamber,
a filter in said filter chamber,
an incinerator,
means including a normally open valve means for introducing liquid raw wastewater into said treating chamber when said valve means is open and for storing raw wastewater in said holding tank when said valve means is closed,
means for periodically discharging stored wastewater from said holding tank to said treating chamber,
means for aerating the wastewater contained in said treating chamber,
means for stopping aeration of said wastewater in said treating chamber to permit solids therein to settle as a sludge in the bottom of said treating chamber,
means for conducting supernatant liquid from said treating chamber to said filter chamber, means for discharging filtered liquid from said filter chamber, means for conveying sludge from said treating chamber to said incinerator, means operable when said treating chamber is at least partially filled for operating said incinerator to burn said sludge, and means for conveying the gaseous combustion products from said incinerator into the lower portion of said treating chamber, and means for automatically controlling the operation of said unit through an operating cycle including a sequence of operations comprising:

closing of said valve means to prevent flow of raw wastewater into said treating chamber whereby raw wastewater introduced into said unit collects in said holding tank, stopping aeration and permitting solids in said chamber to settle as a sludge in the bottom thereof, and conducting the supernatant liquid from said treating chamber to said filter chamber.

7. A home wastewater treating unit comprising:

a treating chamber, a holding tank, a filter chamber, a filter in said filter chamber, an incinerator, means including a normally open valve means for introducing liquid raw wastewater into said treating chamber when said valve means is open and for storing raw wastewater in said holding tank when said valve means is closed, means for periodically discharging stored wastewater from said holding tank to said treating chamber, means for aerating the wastewater contained in said treating chamber, means for stopping aeration of said wastewater in said treating chamber to permit solids therein to settle as a sludge in the bottom of said treating chamber, means for conducting supernatant liquid from said treating chamber to said filter chamber, means for discharging filtered liquid from said filter chamber, a storage chamber for storing a portion of said filtered liquid, means operable for conducting the filtered liquid in said storage chamber in a reverse direction through said filter and into said treating chamber, means for conveying sludge from said treating chamber to said incinerator, means operable when said treating chamber is at least partially filled for operating said incinerator to burn said sludge, and means for conveying the gaseous combustion products from said incinerator into the lower portion of said treating chamber, and means for automatically controlling the operation of said unit through an operating cycle including a sequence of operations comprising:

closing of said valve means to prevent flow of raw wastewater into said treating chamber whereby raw wastewater introduced into said unit collects in said holding chamber, stopping aeration and permitting solids in said tank to settle as a sludge in the bottom thereof, conducting the supernatant liquid from said treating chamber to said filter chamber, and periodically reverse flowing liquid from said storage chamber through said filter and into said treating chamber.

8. A wastewater treating unit comprising:

a wastewater treating chamber adapted to operate alternatively as an aerobic digestion chamber and as a settling chamber, a filter component having a filter therein, means for transferring supernatant liquid from said treating chamber to said filter component after settlement of sludge in said treating chamber, means for chlorinating said liquid during transfer, said filter component comprising a storage chamber volume for receiving and storing liquid after passage thereof through said filter, said chamber being positioned above the top of said filter, a conduit including a normally closed valve ahead of said filter and connecting said filter component to said treating chamber, and means responsive to an increase in liquid head in said filter component ahead of said filter resulting from a decrease in the porosity of said filter for opening said valve whereby the liquid contained in said storage chamber will backwash through said filter and into said treating chamber to remove filtered particles from said filter.

9. A wastewater treating unit comprising:

a wastewater treating chamber adapted to operate alternatively as an aerobic digestion chamber and as a settling chamber, a filter component having a filter therein, means for transferring supernatant liquid from said treating chamber to said filter component after settlement of sludge in said treating chamber, means for chlorinating said liquid during transfer, said filter component comprising a first volume above said filter and second volume for storing liquid after passage thereof through said filter, said second volume being above the top of said filter, a conduit including a normally closed valve connecting said first volume to said treating chamber, and means responsive to an increase in liquid head in said first volume resulting from a decrease in the porosity of said filter for opening said valve whereby the liquid contained in said second volume will backwash through said filter and into said treating chamber to remove filtered particles therefrom.

References Cited

UNITED STATES PATENTS

| | | | |
|---|---|---|---|
| 2,072,154 | 3/1937 | Butterfield | 210—195 X |
| 2,094,909 | 10/1937 | Baily et al. | 210—152 X |
| 2,228,017 | 1/1941 | Pecker | 210—73 X |
| 2,254,953 | 9/1941 | Thomas | 210—259 X |
| 2,777,816 | 1/1957 | Schumacker et al. | 210—141 X |
| 2,938,630 | 5/1960 | Novak | 210—258 X |
| 3,123,555 | 3/1964 | Moore | 210—195 X |
| 3,123,556 | 3/1964 | Gilbert | 210—195 X |
| 3,126,333 | 3/1964 | Williams | 210—256 X |
| 3,244,285 | 4/1966 | Allen | 210—143 |
| 3,260,366 | 7/1966 | Duff et al. | 210—108 X |

REUBEN FRIEDMAN, *Primary Examiner.*

F. SPEAR, *Assistant Examiner.*